United States Patent [19]

Ausnit

[11] 4,447,935
[45] May 15, 1984

[54] DEVICE FOR AND METHOD OF JOINING SHEET MATERIAL

[75] Inventor: Steven Ausnit, New York, N.Y.

[73] Assignee: Minigrip, Inc., Orangeburg, N.Y.

[21] Appl. No.: 352,320

[22] Filed: Feb. 25, 1982

[51] Int. Cl.³ .................... A44B 17/00; A44B 21/00
[52] U.S. Cl. .................... 24/201 C; 24/459;
   24/576; 160/327; 160/383; 160/391
[58] Field of Search .......... 24/201 C, 255 SL, 243 K,
   24/201 HH; 428/121, 157, 156, 161, 162, 163;
   40/16.6; 160/327, 382, 383, 391, 392, 394, 395,
   397

[56] References Cited

U.S. PATENT DOCUMENTS

| | | | |
|---|---|---|---|
| 2,739,089 | 3/1956 | Hageltorn | 154/43 |
| 2,784,781 | 3/1957 | Rhoades | 160/397 |
| 3,049,779 | 8/1962 | Ausnit | 24/201 C |
| 3,068,939 | 12/1962 | Commisso | 24/201 C |
| 3,142,550 | 7/1964 | Kuehne | 160/391 |
| 3,203,062 | 8/1965 | Ausnit | 24/201 C |
| 3,373,464 | 3/1968 | Ausnit | 24/201 |
| 3,379,237 | 4/1968 | Worthington | 160/371 |
| 3,552,476 | 1/1971 | Le Tarte | 160/371 |
| 3,818,550 | 6/1974 | Cresswell | 24/243 K |
| 3,965,546 | 6/1976 | Hickle | 24/243 K |
| 4,053,008 | 10/1977 | Baslow | 160/327 |
| 4,107,826 | 8/1978 | Tysdal | 24/201 C |

Primary Examiner—Robert A. Hafer
Assistant Examiner—Paul S. Polakowski
Attorney, Agent, or Firm—Hill, Van Santen, Steadman & Simpson

[57] ABSTRACT

A device for mechanically joining sheet material, comprising a separable fastener which may have a pair of complementary extruded plastic members provided with resiliently separable interlocking fastener profiles, and at least one, and generally both, of the fastener members having releasable jaw extension structure for receiving and gripping and retaining sheet material to be joined. In certain forms, the jaw structure includes locking bar means arranged to be inserted into a cavity of the jaw structure. The jaw structure may be extruded from a plastic of greater durometer than the interlocking profiles.

24 Claims, 12 Drawing Figures

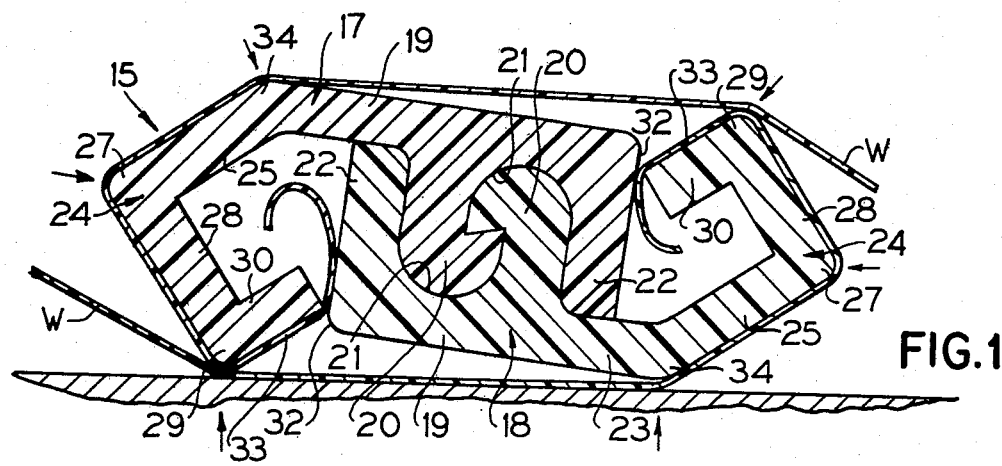
FIG. 1
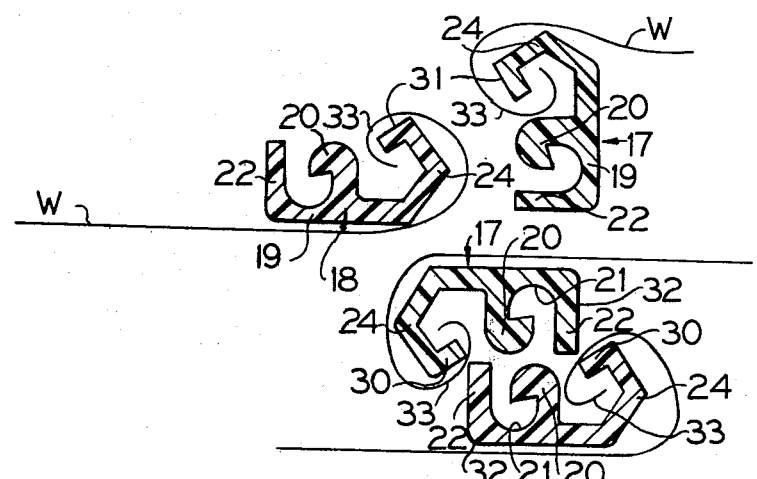
FIG. 2
FIG. 3
FIG. 4
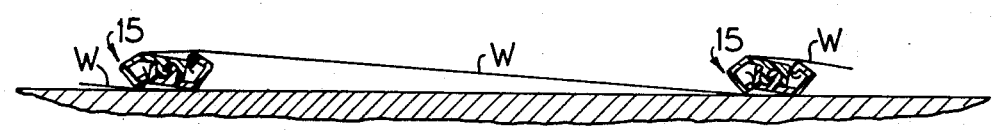
FIG. 5
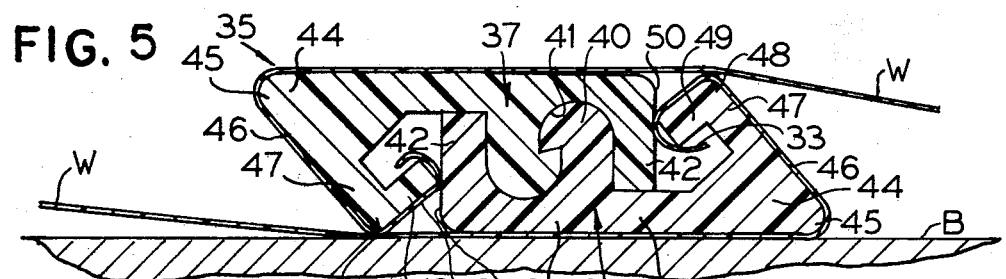
FIG. 6

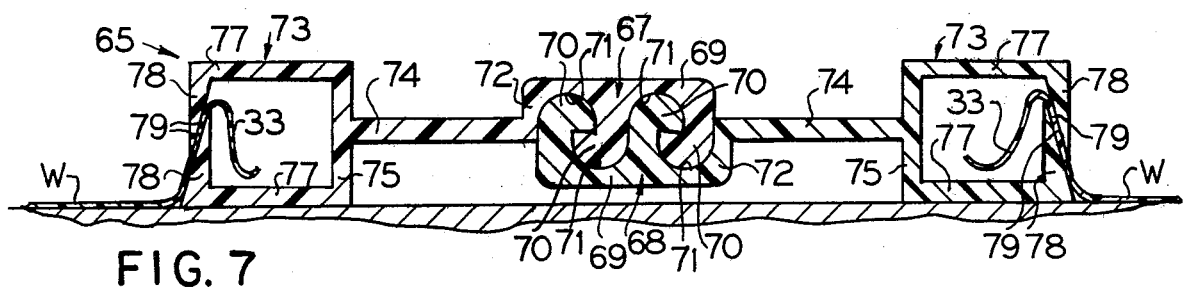
FIG. 7
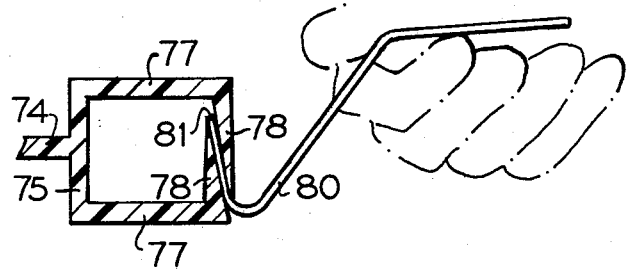
FIG. 8
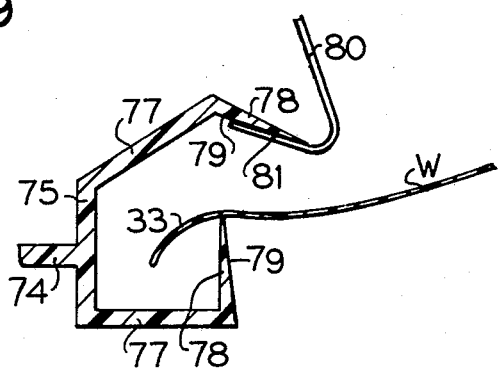
FIG. 9
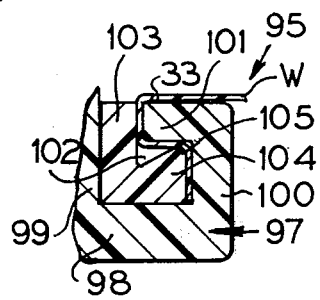
FIG. 11
FIG. 10
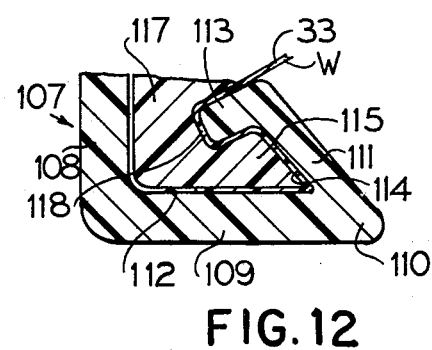
FIG. 12
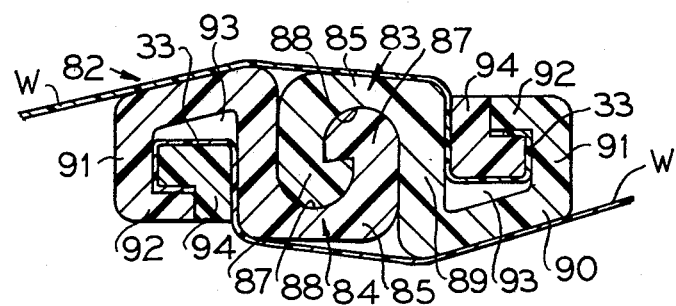

DEVICE FOR AND METHOD OF JOINING SHEET MATERIAL

This invention relates to a new and improved device for and method of joining sheet material, and is more particularly concerned with utilizing separable fastener means for this purpose.

Numerous and varied separable fastener designs employing extruded configurations have interlocking generally hook-shaped ribs which are adapted to be either snapped together and snapped apart or interlocked and separated by means of a slider device. Such separable fasteners are formed from suitable resilient plastic material, such as vinyl, polyethylene or other thermoplastic or thermosetting material. A typical example of such a fastener is found in U.S. Pat. No. 2,739,089, in which complementary fastener strips are extruded as part of plastic web or film for separably securing edges of the same web together or for separably securing the edges of separate webs together.

In an adaption of such a separable fastener, as represented in U.S. Pat. No. 3,373,464, flexible sheeting is adapted to be anchored by means of the separable fastener secured to the margin of the sheeting as by sealing a web on the fastener to the sheet margin.

In both of the representative patent disclosures referred to above, should the sheet or web to which the fastener is attached become unusable for any reason, the fastener must be discarded with the attached web, although because of the relatively larger mass of material in the fastener section or sections, there may still be much useful life in the fastener. This is especially significant for heavy duty separable fasteners, such as may be useful in securing together sheets for covering large areas such as playing fields or sport arenas, roofs, or other areas where a more or less temporary covering may be needed and the sheets adapted to be separated from one another or from an anchorage. The cost of heavy duty fasteners of this type is relatively high in comparison with the unit cost of the sheet material, and therefore if the fastener or a component of the fastener must remain with the sheet if the sheet is discarded, significant monetary loss is involved. On the other hand, substantial savings can accrue where the fastener is reusable with other or replacement sheets. In such event, sheets of different grade or material may be employed initially or substituted as desirable without requiring new fasteners or having to match the fastener material with the sheet material.

It is accordingly an important object of the present invention to provide a new and improved device for effecting a mechanical joint for sheet material, that is, instead of separable fastener means being permanently attached to the sheet, the sheet and fastener means are releasably attached to one another.

To this end, the invention provides a device for mechanically joining sheet material, comprising a separable fastener including extruded plastic, resilient, separable interlocking fastener profile means; and releasable jaw means on the fastener for receiving and gripping and retaining said sheet material.

The invention also provides a method of mechanically joining sheet material, comprising providing a separable fastener including extruded plastic, resilient separable interlocking fastener profile means; and receiving in and gripping and retaining said sheet material in jaw means of the fastener.

Other objects, features and advantages of the invention will be readily apparent from the following description of certain representative embodiments thereof, taken in conjunction with the accompanying drawings, although variations and modifications may be effected without departing from the spirit and scope of the novel concepts embodied in the disclosure and in which:

FIG. 1 is a cross-sectional detail view showing a representative best mode fastener assembly and connected web material;

FIG. 2 is a schematic illustration showing a step in assembling the device of FIG. 1;

FIG. 3 is a similar view to FIG. 2 but showing a further step in effecting the assembly;

FIG. 4 is a smaller scale transverse sectional detail view showing how a plurality of web sheets is adapted to be connected together by means of the device of FIG. 1;

FIG. 5 is a transverse sectional view similar to FIG. 1 but showing a modification;

FIG. 6 is a similar view showing another modification;

FIG. 7 is a similar view showing still another modification;

FIGS. 8 and 9 demonstrate a means for opening the releasable jaw means of the device of FIG. 7;

FIG. 10 is a transverse sectional view showing yet another modification;

FIG. 11 is a fragmentary sectional detail view of yet another modification; and

FIG. 12 is a similar view of a yet further modification.

On reference to FIGS. 1–4, a device 15 embodying the invention comprises a pair of complementary, coactive separable fastener members 17 and 18, each of which is adapted to be substantially identical with the other, and comprises an extruded section formed from suitable resilient plastic material, and in which the several portions of the section are resiliently flexible within desired parameters but have significant form retaining capability for the intended purpose.

In the structure shown, each of the fastener members 17 and 18 may be derived from a common extrusion cut to desired length. Each of the members 17 and 18 has a body 19 provided with resilient, separable interlocking fastener profile means comprising a profile rib 20, and at the hook side of the profile 20 in each instance a groove 21 generally complementary to the shape of the profile rib and adapted to receive the profile rib 20 of the companion member in interlocking relation for retaining the members in assembly. It will be noted that the groove 21 in each instance is defined at its side opposite the associated profile rib 20 by a retaining side wall flange 22 which cooperates with the associated profile rib 20 for retaining the profile rib 20 of the other of the members in the assembly.

For mechanically attaching sheet or web means W to the device 15, releasable jaw structure means are provided on the fastener for receiving and gripping and retaining the sheet material W. For this purpose, each of the fastener member bodies 19 has integral therewith an extension flange 23 which is adapted to extend beyond the edge of the side flange 22 assembled therewith. A generally reverse bent jaw profile section configuration 24 integral with the extension 23 has a flange portion 25 projecting diagonally away from the body but biased in the direction of the projection of the profile 20 integral therewith. At a juncture elbow rib 27, the flange 25 joins an integral flange 28 which extends generally normal to the flange 25 in a slanting direction generally toward and in the same direction as the profile 20 integral therewith. At a juncture elbow rib 29, the flange 28 joins a jaw terminal flange 30, which extends generally normal to the flange 28 and is directed toward the fastener profile 20 integral therewith in a preferably gap relation which is normally narrower than the thickness of the flange 22 of the other of the members 17 or 18, as the case may be, interposed between the edge of the jaw flange 30 and the adjacent profile rib 20. It will be observed that the outer surface of the jaw flange 30 provides a cam surface 31 as a convenient guide for assembling the flange 22 and facilitating spreading the jaw flange 30, whereby to develop a clamping jaw reaction of the edge or tip of the flange 30 toward and against a shoulder surface 32 provided by the outer side of the flange 22 assembled therewith, or stated another way, the adjacent end of the body 19. The clamping jaw arrangement is adapted for effectively gripping a marginal portion 33 of one of the sheets W, substantially as shown, whereby to retain the sheet in assembly with the fastener device 15.

If preferred, the interlocking parts 20, 22, of the fastener may be made of a material with greater resilience or lower durometer than the film retaining jaw sections 24.

In an arrangement wherein the device 15 is required to secure two sheet margins, as shown, attachment may be effected substantially as demonstrated in FIGS. 2 and 3. Accordingly, one of the sheet margins 33 is adapted to be engaged in the jaw hook 24 of the member 17 and the other sheet margin 33 in the jaw hook 24 of the member 18, with the sheet in each instance extending in the opposite direction over the outer side of the body 19 of the respective member. The fastener profiles 20 and the flanges 22 and the jaw hooks 24 are then substantially aligned as shown in FIG. 3 and pressed together with the sheet margins 33 in place and thus secured in the jaws 30, 32. Release of the sheet margins from the device 15 may be effected by reverse manuever, namely, separating the fastener members 17 and 18 and thereby releasing the sheet margins 33 from the jaw means.

As shown in FIG. 4, a plurality of three or more sheets W may be secured together releasably by means of a plurality of the fastener devices 15.

After the sheet margins 33 have been secured by the jaw means, the expanses of the sheets W will wrap the jaw profiles 24 and, in particular, the elbow ribs 27 and 29 thereof and an elbow rib 34 at the juncture of the fastener bodies 19 and the jaw profile flange 25 in each instance. Jaw gripping stability is obtained by thrusting of the opposite sheet W in each instance toward the other jaw structure and against the other sheet margin wrapped onto the associated rib shoulder 29 in each instance. Tension that may be applied in the plane of the sheet W in each instance in a direction away from its margin 33 will result in additional pressure generally inwardly toward the gripping jaw 30, 32 in each instance, and thereby enhance the jaw gripping effect. Respective directional arrows indicate the direction of pressure thrust at each of the respective rib shoulders 27, 29 and 34.

In FIG. 5, a fastener device 35 similar to the device 15 is shown, but with a capability of withstanding greater web or sheet tension. To this end, the device 35 comprises a pair of fastener members 37 and 38, which are preferably substantially identical and complementary.

Each of the members 38 is preferably made as a resilient plastic extrusion of suitable mass and comprises a body 39 having at least one resilient, separable interlocking fastener profile 40 adapted to be received interlockingly in a complementary groove 41 of the companion member, and with a flange 42 of the companion member cooperating to maintain the interlocked relationship therewith. An extension 43 of the body 39 in each instance projects past the edge of the flange 42 of the companion member assembled therewith and terminates in a relatively massive stabilizing bar 44 having a surface in a plane with the outer surface of the body 39. The bar 44 provides a shoulder and elbow rib 45 from which a surface 46 of the bar 44 extends obliquely away from the elbow 45 and is biased generally toward the profile 40 integral therewith. The surface 46 leads into a coplanar surface of a jaw neck flange 47 which at an elbow rib juncture 48 joins a generally right angular terminal jaw flange 49 extending in a direction generally toward the body 39 and the adjacent fastener profile 40. This provides for a gripping jaw engagement with a jaw surface 50 on the adjacent outer side of the flange 42 which is engaged in interposed relation between the jaw flange 49 and the adjacent profile 40. Thereby, the sheet margin 33 is adapted to be gripped in the jaw, and the sheet wrapped about the jaw flange 49, the elbow rib 48, the bar 44 including the elbow 45, and the body 39 including the extension 43. In this instance, pressure applied by the uppermost of the sheets W against the upper fastener members 37 and against the rib elbow 48 of the lower member 38 presses the body 39 of the lower member 38 and the stabilizing bar 44 firmly against an underlying base B and thereby resists reverse tipping of the assembly 35 when substantial tension is applied to the sheets W. In fact, during assembly of the components, and assuming the sheets W to be extending in the same direction as shown in FIG. 5, the member 37 may initially lie on the surface B and the member 38 then assembled with the member 37, while the sheets W are slack. Then, after the members 37 and 38 have been secured together, and the sheet margins 33 accordingly gripped in the jaws 49, 50, the device 35 is adapted to be swung over into the position shown in FIG. 5, wherein the member 38 is at the bottom and resting against the surface B. This manuever may be relied upon to place the sheets W under tension, and which tension would be maintained because of the resistance of the assembly 35 to reversal, that is, to flip over from the position shown, as already explained.

In a modified form of the invention as shown in FIG. 6, a device 51 is adapted for use with the sheets W in a relatively slack or at least minimally tensioned condition. For this purpose, the device 51 comprises preferably substantially identically complementary fastener members 52 and 53 formed from suitable resilient plastic material. Each of the members 52 and 53 has a body 54 carrying at least one resilient, separably interlocking fastener profile 55 adapted to interhook retainingly with a similar profile 55 of the other member when received in a complementary groove 57 of the other member. Respective end flanges 58 on the members 52 and 53 cooperate with the profiles 55 for maintaining the interlocked relationship.

Releasable jaw means are provided on the fastener 51 for receiving and gripping and retaining the sheet material W. For this purpose, each of the body portions 54 of the members has an extension 59 which projects beyond the edge of the flange 58 of the assembled companion fastener member. At an elbow 60 of the extension 59, an integral jaw flange 61 extends obliquely and generally toward, the profile rib 55 of the member, and is adapted to thrust in clamping relation toward the confronting surface of the assembled flange 58 and more particularly the end of the body 54 of the companion fastener member. For multiple jaw clamping of the margin 33 of the associated sheet W in each instance, each of the distal end surfaces of the flanges 58 is adapted to provide engagement in clamping relation with the confronting surfaces of the extension 59 thereby providing a complementary jaw 62. Further, in order to enhance the gripping and retaining effect of the jaw provided by the jaw flange 61 and the jaw surface of the companion fastener member, a generally roughened jaw surface 63 may be provided on the jaw member 61, and a complementary roughened jaw surface 64 may be provided on the coactive jaw surface of the associated separable fastener member. Roughening of the jaw surfaces 63 and 64 may be effected by providing closely arranged narrow and shallow ribs formed as a part of the extrusion process in making the respective fastener members, or by applying and attaching an abrasive powder onto the respective jaw surfaces.

Another form 65 of the device embodying features of the invention for mechanically joining sheet material is disclosed in connection with FIGS. 7-9. In this form, the device 65 contains separable fastener members 67 and 68 which have, similarly as in the other forms of the device, respective body portions 69, each of which in this instance has a pair of similar laterally spaced generally hook-like resilient, separably interlocking fastener profile ribs 70 which are retainingly interengageable with the profile ribs of the companion fastener member within respective grooves 71 provided for this purpose in the fastener members 67 and 68. Each of the fastener members has a relatively short retainer flange 72 at the end of the body 69 and extending in generally the same direction as the fastener profile ribs 70 of the member and cooperating retainingly with said fastener ribs 70 of the assembled fastener member.

Releasable jaw means are provided on the device 65 for receiving and retaining the sheet material W, and in this instance, comprise a respective jaw structure 73 on each of the members 67 and 68 integrally joined with the end portion of the end flange 72 by means of a spacer flange 74 extending laterally and having integral therewith a rear wall 75 of the jaw structure 73 which is of generally box beam shape in cross section and has spaced substantially coextensive wall portions 77 extending from the ends of the wall 75. Cooperating jaw elements 78 project toward one another from the ends of the wall portions 77 remote from the wall 75. Each of the elements 78 has an elongate oblique complementary jaw surface 79 which is clampingly engageable with the marginal portion of the sheet W disposed therebetween. In this instance, the jaw structures 73 are constructed of as stiff a plastic material as practicable while still permitting resilient deflectability of the jaws 78 for releasably receiving the sheet margin 33 to be associated therewith.

As demonstrated in FIGS. 8 and 9, for receiving the sheet margin 33 within the jaw provided by the jaw elements 78, the jaw elements are pried apart, as is enabled by the resiliently flexible characteristics of the jaw structures 73. Because of the relative resilient stiffness of the jaws 78, a tool 80 may be employed having a flat prying lip 81 adapted to be inserted between the jaws 78 as shown in FIG. 8, and then manipulated to pry the outer of the jaws 78 away from the inner of the jaws 78 as shown in FIG. 9, so that the sheet margins 33 may then be inserted between the pried apart jaws. Upon release of the manipulated jaw, the leverage resiliency of the wall portion 77 associated with the pried jaw element as well as the resiliency of the jaw element, sometimes referred to as memory factor, causes the released jaw member to return into clamping gripping relation to the companion jaw member for grippingly retaining the associated sheet margin. To release the sheet margin, a similar tool-assisted spreading of the jaws 78 may be effected.

In another form of the invention as shown in FIG. 10, a device 82 for mechanically joining the sheet material W has releasable jaw means including a supplementary jaw interlock structure. In this instance, the device 82 comprises separable fastener members 83 and 84 which are preferably substantially identical complementary plastic extrusions, each of which has a body 85 having thereon at least one resilient, separable interlocking fastener profile rib 87, engaged in a complementary groove 88 in the companion fastener member and defined at one side by the profile rib 87 of the companion fastener member and on the opposite side by a retaining flange 89 extending from the body of the companion fastener member. Projecting from the flange 89 in each instance is a jaw extension flange 90 which joins a jaw flange 91 projecting in the opposite direction from the flange 89 and in spaced relation thereto and has at its distal end a jaw terminal 92 which is directed toward the flange 89. This provides a channel 93 overhung by the jaw terminal 92 and within which a generally L-shaped cross section interlocking jaw bar 94 is received in cooperative relation with the jaw structure for clamping and retainingly gripping the sheet margin 33 engaged therein. Although the locking bar 94 may be a rigid member, it is desirably made as an extrusion from similar plastic material as the fastener members 83 and 84. By having the locking bar 94 of complementary cross sectional shape to the jaw structure involving the jaw flange 91 and the jaw terminal 92 as well as the adjacent surface of the flange 89, in each instance, the sheet margin 33 engaged by and between the plurality of coacting jaw surfaces will be firmly retained against unintentional withdrawal up to the limit of sheet tension resistance for which the device is constructed. By having not only the members 84 and 83 made of a friction material, but also the locking bar 94 made of friction material, frictional resistance to withdrawal of the sheet margin 33 is added to the clamping gripping resistance to such withdrawl afforded by and between the several cooperating jaw surfaces.

In another form of the invention as shown in FIG. 11, a device 95 for mechanically joining sheet material may comprise a separable fastener in which the fastener member may be, insofar as the interlocking fastener structure is concerned, the same as in any of the already described forms of the invention and, for example, the same as in FIG. 10. However, jaw structure 97 comprises a flange extension 98 projecting generally normal from the end flange 99 of the fastener member. Extending generally normally from the distal end portion of the flange 98 is a jaw flange 100 which has a jaw terminal flange 101 extending normal thereto and overhanging an undercut recess 102 within which is received a complementary generally L-shaped cross section locking bar 103, which is adapted to seat against the flange 99 and the extension 98 and provides a fairly stiff rib portion 104 which coacts in retaining jaw relation with the inner surface of the jaw flange 100 and thrusts a ridge 105 into the reentrant corner defined between the jaw flange 100 and the overhanging jaw terminal 101. Thereby, the entrapped sheet margin 33 is firmly gripped retainingly. In addition, jaw surfaces provided by the jaw terminal 101 and the confronting portion of the locking bar 103 provide another material margin gripping jaw so that the sheet margin 33 is retainingly gripped by a plurality of jaws provided by the jaw structure 97.

In FIG. 12, a device 107 for mechanically joining sheet material comprises separable fastener members which may be similar to those already described, and for example, like the members in FIG. 10, although a plurality of interlocking fastener profiles may be provided as in FIG. 7. In this instance, an end flange 108 has a jaw base extension flange 109 projecting into a stabilizer bar which at juncture 110 joins a jaw flange 111 which projects obliquely over a recess 112 and has a jaw terminal 113. A generally triangularly shaped undercut cavity 114 is defined by and between the inner surfaces of the flange 109, the jaw flange 111 and the jaw terminal 113, within which a complementally shaped generally triangular cross section portion 115 of a locking bar 117 is firmly engaged to provide a plurality of clamping gripping and retaining jaw surfaces within and between which the associated sheet margin 33 is engaged. In addition, the locking bar 117 desirably has a jaw groove 118 complementary to and receptive of the jaw terminal 113 and providing additional multiple clamping gripping surfaces cooperative to further retain the sheet margin 33.

It may be noted in all of the forms of FIGS. 10-12 that by virtue of the generally L-shaped cross section of the respective locking bars, and the complementary shape of the groove or channel recess into which the locking bar is engaged, assembly is adapted to be effected by tilting in the clamping jaw leg of the bar into the complementary recess in the jaw structure of the fastener member, and that in such tilting in assembly, the sheet margin is adapted to be efficiently drawn into the jaw engaged relationship. Resiliency of the jaw structures facilitates the assembly manuever.

With respect to all forms of the invention, it will be apparent that there is substantial resistance to entrance of water into the joints effected by the devices by reason of the sealing engagement of the various parts of the devices, and in particular, the jaw structures.

Whereas the devices may be formed in any desired length, for practical purposes it may be preferable to provide the devices in sections of lengths that can be handled conveniently, and as many of the sections may then be used in end-to-end relation along the length of a long sheet material joint as needed. For example, in covering a sports arena, the sheet material may be supplied in rolls which will extend across a considerable width or length of field, and joints between contiguous sheet strips can then be effected by utilizing a series of as many of the sectional lengths of fastener device in end-to-end relation as may be necessary to complete a given joint.

It will be understood that variations and modifications may be effected without departing from the spirit and scope of the novel concepts of this invention.

I claim as my invention:

1. Two margins on substantial expanses of sheet material and a device for mechanically joining the margins, and comprising:

said device having a pair of complementary extruded plastic, elongated separable fastener members each of which has a body provided with complementary resilient rib and groove fastener means adapted for separable interlocking for maintaining said members in a separable fastener assembly;

and each of said members having integrally on and along its body, and laterally spaced from said fastener means a respective releasable sheet-margin-gripping resiliently manipulatable jaw structure;

said jaw structure of one of said members extending along one side of the assembly for retaining one of said sheet material margins in attached relation to said one member and thereby to the assembly, and the jaw structure on the other of said members extending along the opposite side of the assembly for retaining the other of said sheet material margins in attached relation to said other of said members and thereby to the assembly;

and one of said sheet material expanses extending from its margin retained in one of said jaw structures and in partially wrapping relation across said assembly and into grip-enhancing thrusting relation to the other of said jaw structures, and the other of said sheet material expanses extending from its margin retained in said other of said jaw structures and in partially wrapping relation across said assembly and into grip-enhancing thrusting relation to said one jaw structure.

2. A device according to claim 1, wherein each of said jaw structures comprises a resiliently flexible lateral extension on its associated member body, and each of said extensions has a jaw terminal directed toward a cooperative jaw surface facing theretoward in the assembly.

3. A device according to claim 1, wherein each of said member bodies has a jaw surface thereon facing toward the jaw structure of the other member, and said jaw structures have jaw surfaces for thrusting in sheet margin gripping relation against the member body jaw surfaces facing theretoward.

4. A device according to claim 3, wherein at least certain of said jaw surfaces have roughened gripping structure for enhanced sheet material gripping.

5. A device according to claim 1, wherein each of said releasable jaw structures comprises a pair of cooperating separable gripping jaw elements on extensions from the fastener member bodies.

6. A device according to claim 1, wherein each of said jaw structures defines a groove recess, and sheet margin locking bar means engageble in said groove recess.

7. A device according to claim 1, wherein said releasable jaw structures are extrusions formed from a plastic of greater durometer than said interlocking fastener means.

8. A device according to claim 1, wherein each of said jaw structures has a jaw terminal and a surface against which the sheet material margin retained by that jaw structure presses for increasing thrust of said jaw terminal toward a confronting jaw surface in said fastener assembly.

9. A device according to claim 1, wherein said jaw structures have stabilizing integral bar means resisting sheet material tension-effected turnover of the device lying against a supporting surface.

10. A method of mechanically joining two margins of sheet material, comprising:
providing a pair of complementary extruded plastic, resiliently interlockable elongated separable fastener members each of which has a body provided with complementary resilient rib and roove fastener profile means;
separably interlocking said fastener profile means for maintaining said members in a separable fastener assembly;
providing on each of said members integrally on and along its body, and laterally spaced from said fastener profile means, a respective releasable sheet-margin-gripping resiliently manipulatable jaw structure, and with said jaw structure of one of said members extending along one side of the assembly and the other of said jaw structures extending along the opposite side of the assembly;
effecting gripping engagement of one of said sheet margins by one of said jaw structures and effecting gripping engagement of the other of said sheet margins by the other of said jaw structures, and thereby attaching said sheet margins to said separable fastener assembly;
partially wrapping the sheet material which extends from one of said jaw structures across said assembly and into grip-enhancing thrusting relation with the other of said jaw structures;
and partially wrapping the sheet material which extends from the other of said jaw structures across said assembly and into grip-enhancing thrusting relation with said one jaw structure.

11. A method according to claim 10, comprising forming each of said jaw structures as a resiliently flexible lateral extension on its associated member body, and providing on each of said jaw structures a jaw terminal directed toward a cooperative opposing jaw surface facing theretoward in the assembly.

12. A method according to claim 10, comprising providing each of said member bodies with a jaw surface facing toward the jaw structure of the other member, and thrusting jaw surfaces of said jaw structures in sheet margin gripping relation against the member body jaw surfaces facing theretoward.

13. A method according to claim 12, comprising providing certain of said jaw surfaces with roughened gripping structure and thereby enhancing sheet material gripping.

14. A method according to claim 10, which comprise forming said releasable jaw structures as separable gripping jaw elements on extensions from said fastener member bodies.

15. A method according to claim 10, which comprises forming each of said jaw structures with a groove recess, and engaging locking br means in said groove recess and thereby fixing the associated sheet margin in the jaw structure.

16. A method according to claim 10, which comprises extruding said releasable jaw structures from a plastic of greater durometer than said interlocking profiles.

17. A method according to claim 10, which comprises providing each of said jaw structures with a jaw terminal and a shoulder surface, and pressing the sheet material against said jaw shoulder surfaces and thereby increasing thrust of said jaw terminals toward confronting jaw surfaces in said fastener assembly.

18. A method according to claim 10, which comprises forming said jaw structures with stabilizing integral bar means, and utilizing said bar means for resisting sheet material tension-effected turnover of the device as it lies against a supporting surface.

19. A method according to claim 10, which comprises, after grippingly engaging said sheet margins in said jaw structures of the fastener assembly, turning the assembly about its longitudinal axis and thereby effecting said wrapping, and tensioning the sheet material.

20. A device for mechanically joining two margins of sheet material, comprising:
a pair of complementary extruded plastic, elongated separable fastener members ech of which has a body provided with complementary resilient rib and groove fastener profiles adapted for separable interlocking for maintaining said members in a separable fastener assembly;
and each of said members having integrally on and along its body, and laterally spaced from said fastener profiles a respective releasable sheet-margin-gripping resiliently manipulatable jaw structure;
said jaw structure of one of said members extending along one side of the assembly for retaining one of said sheet material margins in attached relation to said one member and thereby to the assembly, and the jaw structure on the other of said members extending along the opposite side of the assembly for retaining the other of said sheet material margins in attached relation to said other of said members and thereby to the assembly;
and each of said releasable jaw structures comprising an integral box beam jaw arrangement having opposed jaw elements which are resiliently biased toward one another and adapted to be pried apart for reception of the sheet material margins to be joined.

21. A device according to claim 20, wherein each of said jaw structures comprises a spacer flange connecting said box beam jaw arrangements to said bodies of said fastener members.

22. A method of mechanically joining two margins of sheet material, comprising:
providing a pair of complementary extruded plastic, resiliently interlockable elongated separable fastener members each of which has a body provided with complementary resilient rib and groove fastener profiles;
separably interlocking said fastener profiles for maintaining said members in a separable fastener assembly;
providing on each of said members integrally on and along its body, and laterally spaced from said fastener profiles, a respective releasable sheet-margin-gripping resiliently manipulatable jaw structure, and with said jaw structure of one of said members extending along one side of the assembly and the other of said jaw structures extending along the opposite side of the assembly;
effecting gripping engagement of one of said sheet margins by one of said jaw structures and effecting gripping engagement of the other of said sheet margins by the other of said jaw structures, and thereby attaching said sheet margins to said separable fastener assembly;
and including extruding said releasable jaw structures from a plastic of greater durometer than said interlocking profiles.

23. A method of mechanically joining two margins of sheet material, comprising:
 providing a pair of complementary extruded plastic, resiliently interlockable elongated separable fastener members each of which has a body provided with complementary resilient rib and groove fastener profiles;
 separably interlocking said fastener profiles for maintaining said members in a separable fastener assembly;
 providing on each of said members integrally on and along its body, and laterally spaced from said fastener profiles, a respective releasable sheet-margin-gripping resiliently manipulatable jaw structure, and with said jaw structure of one of said members extending along one side of the assembly and the other of said jaw structures extending along the opposite side of the assembly;
 effecting gripping engagement of one of said sheet margins by one of said jaw structures and effecting gripping engagement of the other of said sheet margins by the other of said jaw structures, and thereby attaching said sheet margins to said separable fastener assembly;
 and including forming said jaw structures as integral box beam jaw arrangements having opposed jaw elements, resiliently biasing said jaw elements toward one another, and prying said jaw elements apart and inserting the sheet material margins into gripped relation between said jaw elements.

24. A method according to claim 23, which comprises connecting each of said jaw structures to its associated fastener member by means of a spacer flange.

* * * * *